United States Patent
Leinonen

(10) Patent No.: US 6,663,168 B2
(45) Date of Patent: Dec. 16, 2003

(54) TRANSPORT UNIT ATTACHABLE TO TRANSPORT TRUCK

(75) Inventor: Olavi Leinonen, Oulu (FI)

(73) Assignee: Obas Oy, Oulu (FI)

( * ) Notice: Subject to any disclaimer, the term of this patent is extended or adjusted under 35 U.S.C. 154(b) by 0 days.

(21) Appl. No.: 10/187,969

(22) Filed: Jul. 3, 2002

(65) Prior Publication Data

US 2003/0030301 A1 Feb. 13, 2003

(30) Foreign Application Priority Data

Jul. 5, 2001 (FI) .............................. 20011477

(51) Int. Cl.⁷ ............................... B62D 33/02
(52) U.S. Cl. ............................................ 296/182
(58) Field of Search ........................... 296/181, 182, 296/183

(56) References Cited

U.S. PATENT DOCUMENTS

| | | | | |
|---|---|---|---|---|
| 3,185,519 A | * | 5/1965 | Turnbull et al. | 296/181 |
| 4,232,884 A | * | 11/1980 | DeWitt | 280/785 |
| 4,534,589 A | * | 8/1985 | Booher | 296/182 |
| 4,863,189 A | * | 9/1989 | Lindsay | 280/789 |
| 4,930,809 A | * | 6/1990 | Lindsay | 280/789 |
| 5,143,418 A | * | 9/1992 | Fouquet | 296/182 |
| 5,417,453 A | * | 5/1995 | VanDenberg | 280/785 |
| 5,474,331 A | * | 12/1995 | Booher | 280/789 |
| 5,611,570 A | * | 3/1997 | Garcia | 280/789 |
| 5,655,792 A | * | 8/1997 | Booher | 280/789 |
| 5,791,714 A | * | 8/1998 | Hall, Jr. | 296/24.2 |
| 6,109,684 A | * | 8/2000 | Reitnouer | 296/182 |
| 6,382,671 B1 | * | 5/2002 | MacLellan | 280/789 |

OTHER PUBLICATIONS

Marks' Standard Handbook for Mechanical Engineers, McGraw–Hill, 10ᵗʰ Ed., 1996, p. 6.32–6.33.*

* cited by examiner

Primary Examiner—Stephen T. Gordon
Assistant Examiner—Patricia L. Engle
(74) Attorney, Agent, or Firm—Young & Thompson

(57) ABSTRACT

The invention relates to a transport unit attachable to a transport truck, such as a transport truck trailer or body. In accordance with the invention, the transport unit is implemented without a separate frame, the transport unit base being a compartmental, self-supporting base made of stainless steel and forming the frame of the transport unit. In a trailer implementation the trailer base also provides the frame to which the trailer axle groups are fastened.

22 Claims, 5 Drawing Sheets

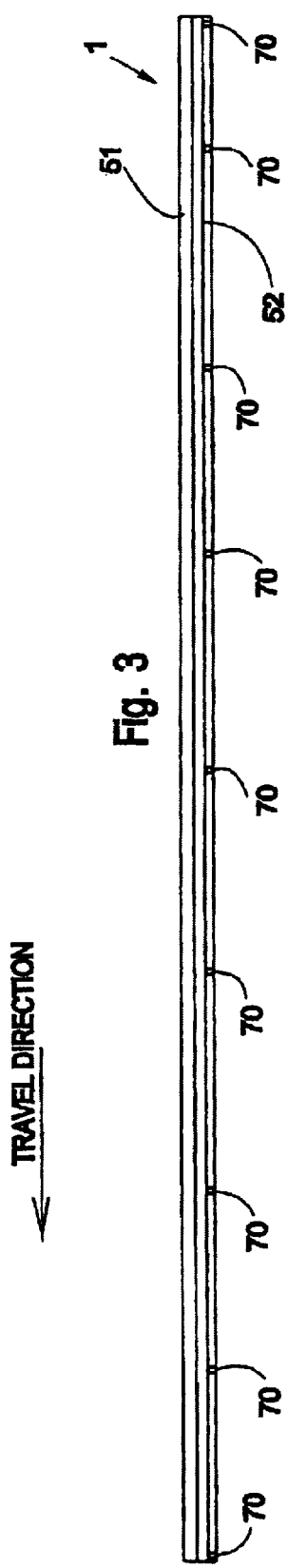
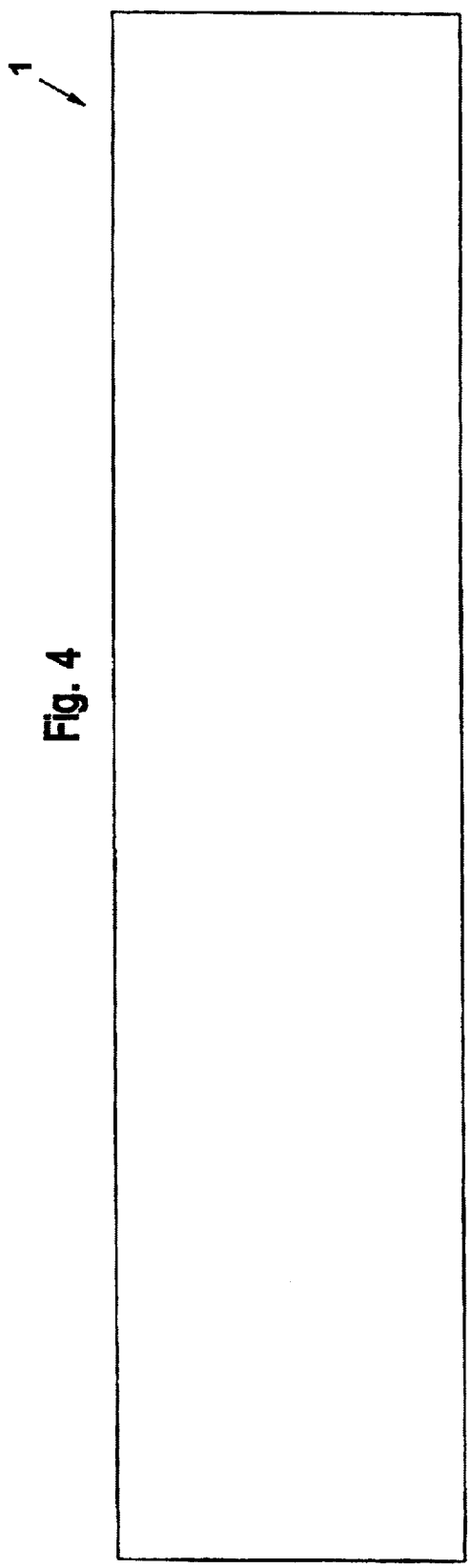

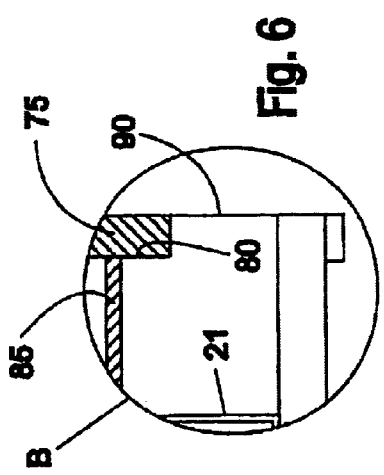
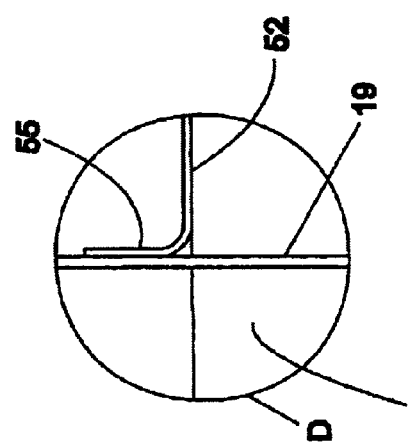
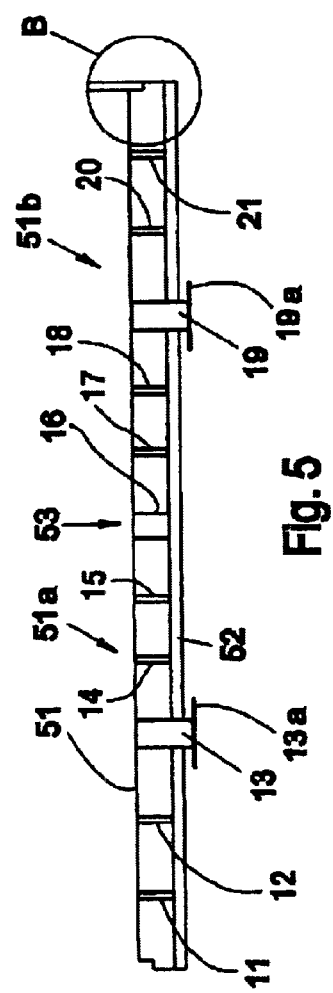
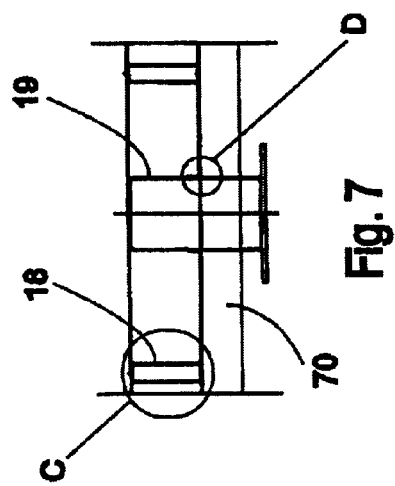
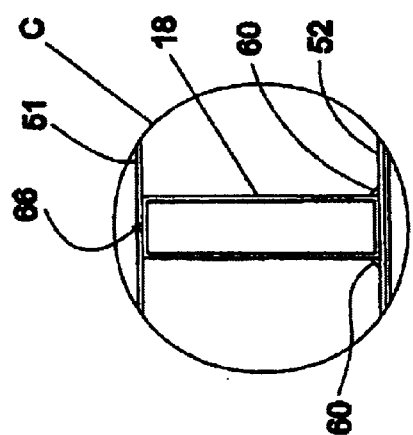

TRANSPORT UNIT ATTACHABLE TO TRANSPORT TRUCK

FIELD OF THE INVENTION

The invention relates to a transport unit attachable to a transport truck, such as a transport truck trailer or body, the transport unit comprising a base.

BACKGROUND OF THE INVENTION

Transports units, such as trailers, are used for the road transport of most diversified goods. Since trailers are required to have a good load carrying capacity, they are equipped with multiple axles, for example five, i.e. with a two-axle front unit and a three-axle rear unit. Most trailers have three, four or five axles. Trailers are commonly used for transporting bulk goods, in which case the unit is a bulk trailer. Another known trailer type is a tank trailer. The demand for continuously enhanced operations naturally concerns the transport service as well, and therefore trailer weight and its useful height are becoming increasingly significant.

In known solutions applied in the field the trailer is provided with a separate frame onto which the trailer floor is built. The frame of the trailer also serves as an attachment for the axle group. The separate frame consists of two longitudinal beams on different sides of the trailer's centre line and multiple transverse support beams between them. The material is common steel, also known as black steel. The longitudinal beams are I-beams, and the number of support beams required between them is high. The vertical reach of the longitudinal beams is as much as 52 cm and even at the front of the trailer it is about 12 cm, the material thickness of the beams being 8 millimeters. The structure is naturally sufficiently stiff for its purpose of use, but a separate frame inevitably increases the weight of the trailer significantly, a further disadvantage of the increased weight being that the two superimposed structures, i.e. the frame and the base, or the floor, above it together form a structure which so high that a maximal useful height cannot be obtained. As regards the prior art solution, reference is made to FIGS. 1a and 1b, which show a separate frame 41, a floor 42, a front axle group 43 and a rear axle group 44. The total length of the five-axle trailer of FIGS. 1a and 1b is about 13.6 meters. In the implementation shown in FIGS. 1a and 1b, the trailer mass without the axles is as much as about 103 kg/m$^2$ and the total height of the construction from the bottom surface of the tires to the upper surface of the trailer base is 1276 mm. The trailer mass naturally decreases the amount of the useful load mass transportable with the trailer. The relatively low useful height of the trailer naturally reduces the capacity of the trailer, which has also a decreasing effect on the amount of useful load. The relatively low useful load capacity naturally has also financial consequences, because the amount of goods transported per time unit is smaller than when a trailer with higher useful load capacity is used. In the transport of some materials, such as peat, the magnitude of the useful load capacity is even highly critical because the transport costs have an impact on the cost effectiveness of the use of the transported material.

When the transport unit in question is a transport truck body, known implementations are basically of the same type as known transport truck trailers, i.e. there is a separate frame under the base of the body. Also the disadvantages are similar, i.e. high weight and relatively low useful height.

BRIEF DESCRIPTION OF THE INVENTION

It is an object of the invention to provide a novel transport unit that allows the above problems to be significantly reduced.

This is achieved with a transport unit attachable to a transport truck, characterized in that the transport unit is implemented without a separate frame, the transport unit base being a compartmental, self-supporting base made of stainless steel and forming the transport unit frame.

The preferred embodiments of the invention are disclosed in the dependent claims.

The basic idea of the invention is that a specially built transport unit floor also serves as the frame of the transport unit. The floor of the transport unit, i.e. the floor of a transport truck trailer or the floor of a transport truck body is thus implemented as a compartmental self-supporting structure. When the transport unit in question is a trailer, the specially constructed floor of the trailer also forms the frame of the trailer to which the axle groups can be attached.

The transport unit of the invention provides several advantages. The most essential advantage is a significant reduction in weight, which in the case of a five-axle trailer of 13.6 meters, for example, is about 1000–1800 kg, depending on the implementation. The lower weight is possible because there is no separate frame. On one hand, the use of stainless steel provides strength and, on the other, it is lighter than a conventional steel material. Moreover, since the structure is implemented without a separate frame and a separate floor on top of it, it has been possible to make the base of the trailer lower, which significantly increases the useful height of the trailer, this increase being, according to the applicant's observations, about 6–7 cm in an implementation of a five-axle trailer of 13.6 meters of the type described above. According to the invention, the weight per square meter obtained for the base of the above five-axle trailer of 13.6 meters is as low as 20 kg/m$^2$, the axles being not included. Irrespective of the purpose of use of the trailer, the reduction in the trailer mass and the increase in the amount of the transportable useful mass resulting from the increased useful height provide significant financial advantages. Due to the increased useful mass the financial implications in the case of a peat trailer, for example, have already a fairly crucial impact in ensuring the economical efficiency of peat transports and, consequently, peat use. The advantages of the invention relative to the transport truck body are similar than those relative to the trailer, i.e. savings in weight and increased useful height.

BRIEF DESCRIPTION OF THE INVENTION

In the following, the invention will be described with reference to the preferred embodiments and the accompanying drawings, in which FIG. 1a shows a prior art trailer;

FIG. 1b is an enlarged cross-sectional view of the trailer floor seen in FIG. 1a;

FIG. 2b is an enlarged cross-sectional view of the trailer area indicated with circle A in FIG. 2a;

FIG. 3 is a side view of a trailer base;

FIG. 4 is a top view of a trailer base;

FIG. 5 is a cross-sectional, schematic view of a trailer base in the longitudinal direction of the trailer;

FIG. 6 is an enlarged view of the structures contained in circle B in FIG. 5;

FIG. 7 illustrates an area of a trailer base comprising three longitudinal frame beams;

FIG. 8 is an enlarged view of the structures indicated with circle C in FIG. 7;

FIG. 9 is an enlarged view of the structures indicated with circle D in FIG. 7;

DETAILED DESCRIPTION OF THE INVENTION

Figure 12:
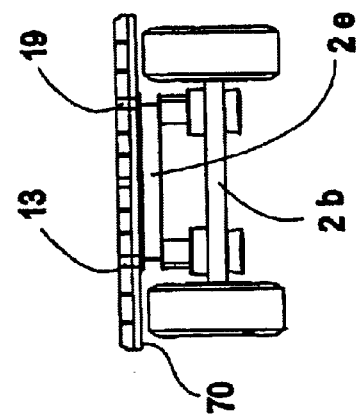
FIG. 12 shows a trailer base and axle groups onto which the trailer base is to be attached, seen in a longitudinal direction of the trailer.
Figure 13:
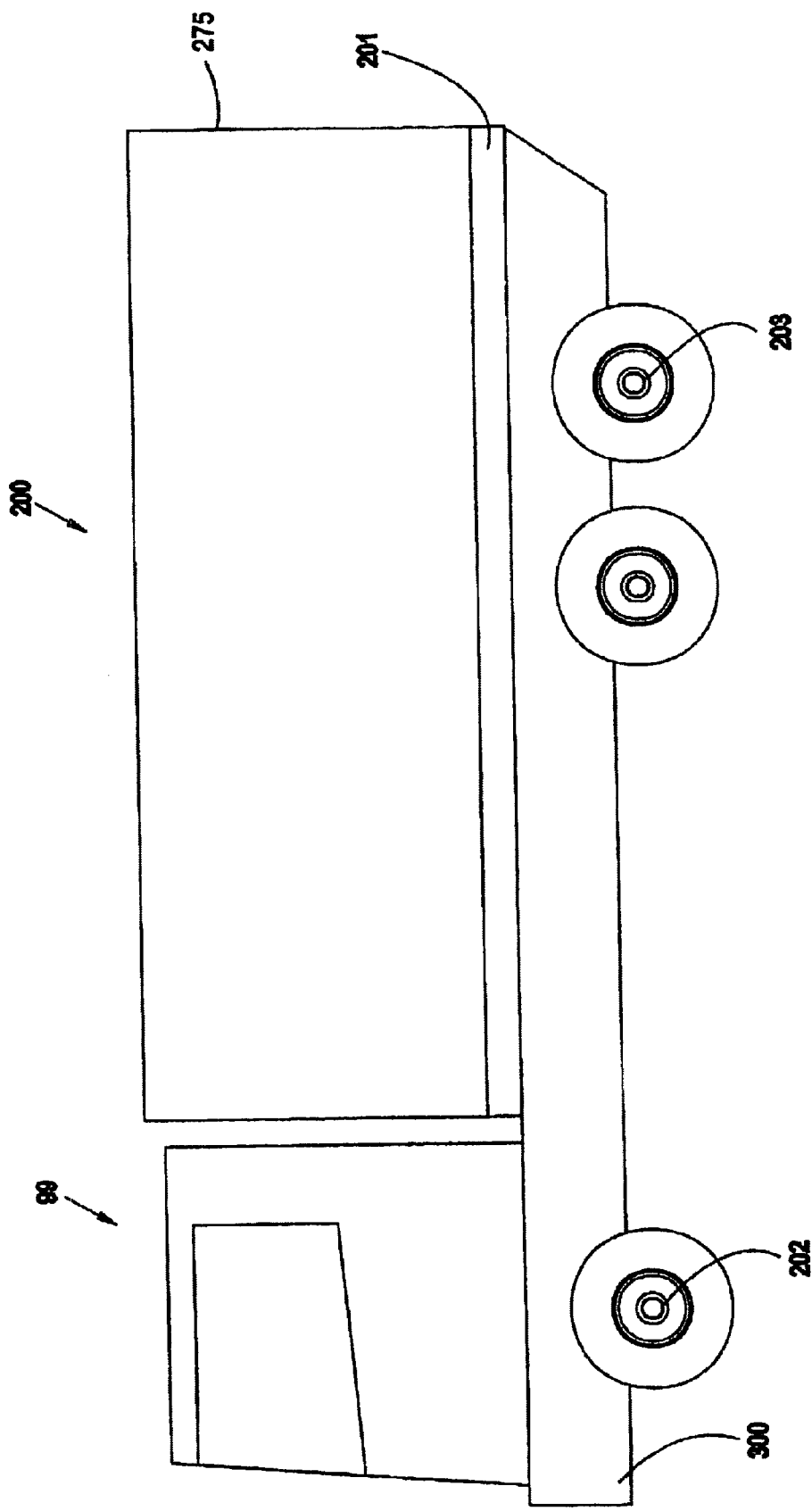
FIG. 13 is a transport truck, the body of the truck constituting a second implementation of the invention.

The invention will be described particularly in relation to the first embodiment of the invention, i.e. the version of FIGS. 2 to 12, in which the transport unit is a trailer of a transport truck. As regards the second embodiment it is noted, however, that in addition to a transport truck trailer the transport unit may be the body of an independent transport truck, as shown in FIG. 13, or the body of a transport truck pulling a trailer. The presentation relating to the first embodiment, i.e. the trailer base, is mostly valid for the second embodiment as well, the main difference being that the axles are not attached to the base of the transport truck body.

Figure 1B:
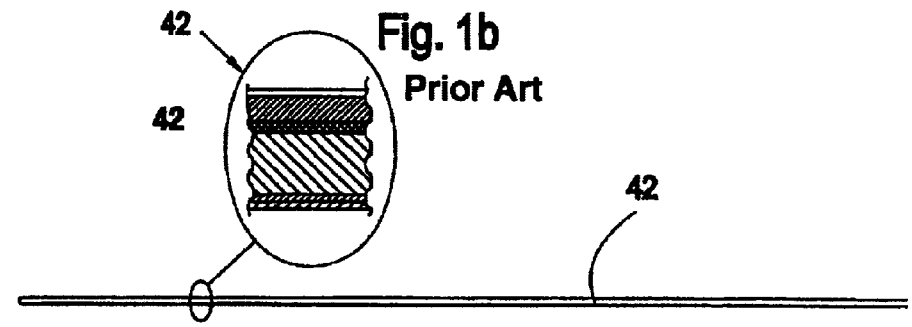
Figure 1A:
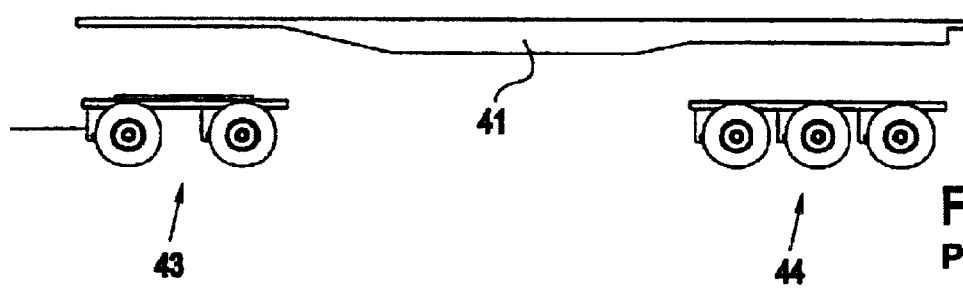
Figure 2B:
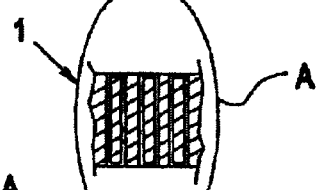
Figure 2A:
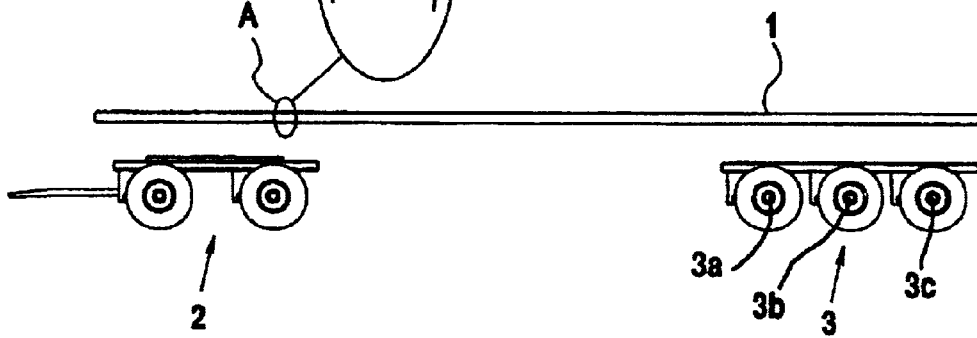
FIG. 2a is a side view of a trailer of the invention.
Figure 10:
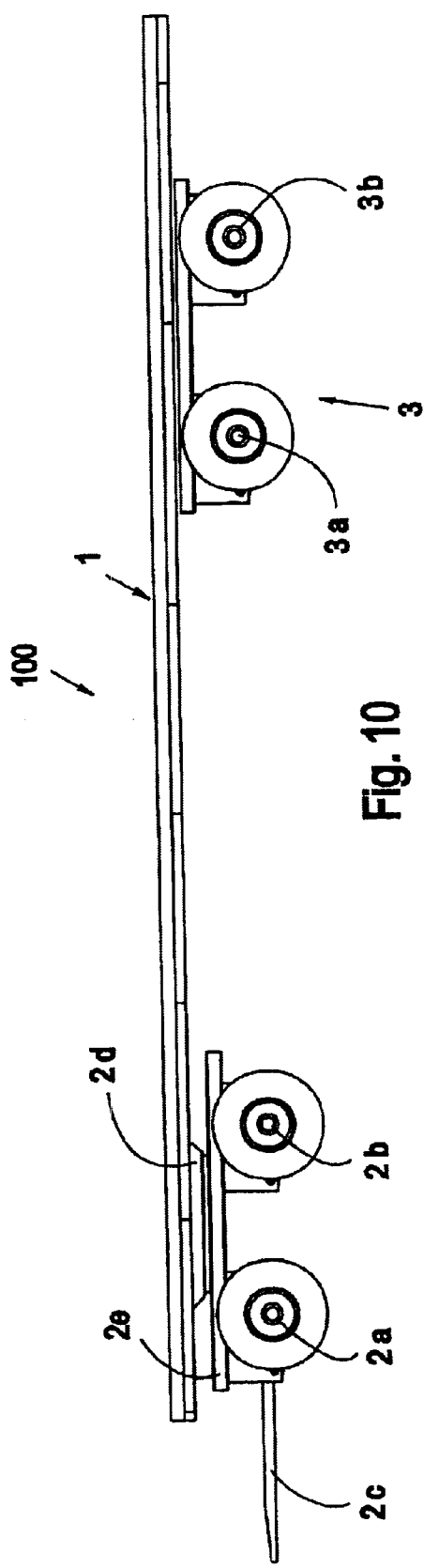
FIG. 10 is a side view of a four-axle trailer.
Figure 11:
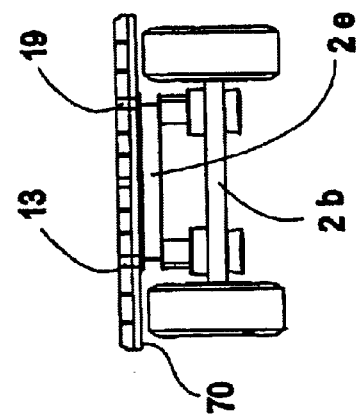
FIG. 11 is a top view of an axle pair.

Thus, FIGS. 2 to 12 show a trailer 100. The trailer comprises a base 1, a front axle group 2 and a rear axle group 3. In the implementation of FIG. 2a the rear axle group comprises three axles 3a, 3b and 3c. In the examples of FIGS. 2a and 10 the front axle group 2 has two axles. As regards the total number of axle groups in the trailer it is noted, however, that their number does not in any way restrict the possibilities of use of the invention; according to the observations made by the applicant, the trailer may be equipped with three, four or five axles. A fastening structure 2e at the front axle group is coupled to a tow bar 2c, the front axle group being fastened to the trailer base via a turntable 2d shown in FIG. 10.

The trailer base 1, i.e. the trailer floor 1, of the invention is self-supporting. The self-supporting trailer floor 1 has a compartmental structure. In other words, the trailer is implemented without a separate body, the trailer base 1 being a compartmental self-supporting base 1 made of stainless steel and the base forming the frame of the trailer, to which body the axle groups 2 and 3 of the trailer can be attached. According to a preferred embodiment the compartmental structure of the base means that the floor 1, or the base, comprises frame beams 11 to 21 arranged at a distance from one another in the longitudinal direction of the truck and connecting structures 51 and 52 connecting the beams. The compartmental self-supporting trailer base 1 thus comprises metal frame beams 11 to 21, metal frame support beams 70 arranged in a transverse direction relative to the frame beams, an upper connecting structure 51 made of a metal plate material and connecting the frame beams 11 to 21 on the upper side of the base area, and a lower connecting structure 52 made of a metal plate material and connecting the frame beams 11 to 21 on the underside of the base area. As regards the frame support beams 70, FIG. 3 in particular shows that the trailer base 1 thus comprises transverse stiffening beams 70. The beams 70 can also be considered as parts of the compartmental base 1. In the examples shown in the FIGS., particularly in FIG. 3, there are seven frame support beams 70, which are stiff tubular beams, the number being significantly lower than in prior art implementations which require as many as about 25 frame support U-beams, i.e. beams that are open on one side and therefore weaker.

The upper connecting structure 51, the frame beams 11 to 21, the lower connecting structure 52 and the transverse frame support beams 70 are made of stainless steel. Since all the structures involved are made of the same material, i.e. stainless steel, there is no electric pair of two different materials that would cause corrosion.

In the implementation according to the preferred embodiment the stainless steel material used in the structural parts of the compartmental self-supporting base 1 comprising the frame beams 11 to 21, the frame support beams 70 and the upper and lower plate-like connecting structures 51, 52 is cold-rolled, or reinforced, stainless steel. This allows a smaller material thickness to be applied and thereby an additional saving in weight of about 20 to 25% to be gained.

According to the preferred embodiment of the invention the lower connecting structure 52 made of a plate-like material is between the frame beams 11 to 21 and the transverse frame support beams 70. The frame support beams 70 are thus below the frame beams 11 to 21, which provides an advantage in that each frame support beam 70 is made as a single uniform beam, because the beam 70 is not made of pieces arranged between adjacent frame beams but as a single item below them.

With particular reference to FIGS. 2b and 5 to 9, it is observed that the preferred embodiment comprises different types of beams, i.e. the beams 13 and 19, shown in FIGS. 5 and 7, which extend furthest down and provide points of attachment for the axle groups 2 and 3. To make the thicker frame beams 13 and 19 of the preferred embodiment to extend further down, the thicker frame beams 13 and 19 are made higher than the thinner frame beams 11, 12, 14, 15, 17, 18 and 20, which allows the downward reach of the frame beams 13 and 19 to be achieved even if the upper surfaces of the beams 11 to 21 were level, which is naturally aimed at to provide a base with an even upper surface, i.e. to allow a plane-like surface plate 51 to be used. On the under surface of the thicker beams 13 and 19, or otherwise in association with them, there are provided fastening pieces 13a and 19a for the fastening of the axle groups thereto. FIG. 12 illustrates the fastening of the trailer base 1 and the axle group 2 together. The trailer base is fastened, by bolting for example, to the fastening structure 2e of the axle group. The width of the fastening pieces 13a and 19a provided on the under surface of the thicker beams 13 and 19 is 200 mm, for example. The thicker frame beams 13 and 19, which serve as the actual fastening beams of the axle groups, are stainless steel beams of 100×200 mm in size, for example. The material thickness of the beams 13 and 19 is 4 mm, for example. The thinner frame beams 11, 12, 14, 15, 17, 18, 20 and 21 may have smaller dimensions than the axle group fastening beams 13 and 19, i.e. the frame beams 13 and 19. A stainless steel beam having the dimensions of 2×100 mm and a wall thickness of less than 2 mm, for example, has been found suitable for the thinner beams. The thinner beams 11, 12, 14, 15, 17, 18, 20 and 21 are thus longitudinal reinforcement beams, although the thicker beams 13 and 19 can also be considered to serve as longitudinal reinforcement beams, although they also contribute to the fastening of the axle groups 2, 3. The centre beam 16 is a tubular reinforcement beam, for example a stainless steel beam of 50×100 mm and a wall thickness of 2 mm, for example.

In a preferred embodiment the distances between the different beams 11 to 21 are of an essentially equal order. A suitable distance is about 155 mm. The compartmental base structure 1 is formed when an upper connecting part 51 is fastened onto the upper surfaces of the beams 11 to 21 and a lower connecting part 52 is fastened along the under surfaces of the thinner beams. Due to the downward reach of the axle group fastening beams 13 and 19, the bottom plate 52 of the preferred embodiment is made of a plural number of parts, for example three, because the two axle beams 13 and 19 divide the bottom surface into three sections.

In this connection particular reference is made to FIG. 6, which shows the joint between the right hand edge of the axle group fastening beam 19 and the bottom plate. FIG. 9 shows a preferred embodiment in which the edge 55 of the bottom plate 52 facing the opening is bent and fastened to the side of the axle group fastening beam 19, which provides a good support and prevents impurities from entering into the compartmental structure. With reference to FIGS. 9 and 7 it is stated that the beams that reach further down, i.e. axle beams 13 and 19, and the edge 55 of the base plate 52 comprise an indentation, or a similar passage, for the transverse beams 70.

In the following, the manufacture of a base having a compartmental structure is briefly discussed. The transverse frame support beams 70 are placed into the indentations of the indented axle beams 13 and 19, i.e. the indented frame beams 13 and 19, and welded to the axle beams 13 and 19 at the edge of the indentation. Next, the (3) parts of the bottom plate 52, i.e. the lower connecting structure, are put in place onto the transverse beams 70, and the necessary welding is carried out. Then the rest of the longitudinal frame beams, such as 11, 12, 14, 15, 16, 17, 18 and 20, are set in place and welded to the bottom plate 52 at the upper side of the bottom plate 52, as shown by a seam 60 in FIG. 8, for example. Next the surface plate 51, i.e. the portions 51*a* and 51*b* are installed in place and welded together and to the beam 16 on top of the beam 16, seam 53 being thereby formed, the plates 51*a* and 51*b* being further welded by means of a through-welding, illustrated for example by seam 66 in FIG. 8, to the rest of the frame beams 11–15, 17–21 as well. As a result, a compartmental base 1 having excellent resistance against stress is accomplished.

As shown in FIG. 8 in particular, the lower connecting structure 52, i.e. the bottom plate 52, is fastened to the beams, such as 11, 12, 14, 15, 16, 17, 18, 20 and 21 by means of flank fillet welds 60, for example. Reference numeral 66 denotes a through-weld, produced by Tandem-welding, for example, that connects the surface plate 51 and the frame beam 11. As shown in FIG. 5, the upper connecting structure 51 made of a plate material comprises at least two connecting structure parts 51*a* and 51*b* made of a plate material, and that the connecting structure parts 51*a* and 51*b* are joined by means of butt seam welding to the upper surface of the frame beam 16 on which the butt joint 53 joining the connecting structure parts 51*a,* 51*b* is. At the butt seam joint on the beam 16 there was first a gap of 2 mm, for example, between the halves 51*a* and 51*b* for the welding.

In a preferred embodiment the beams 11 to 21 and 70 are tubular RST-beams. A tubular beam provides durability and also contributes to the compartmental form of the structure, thereby further enhancing its durability. The connecting parts 51 and 52, i.e. the surface plate 51 and the bottom plate 52 are also made of stainless steel, i.e. using reinforced steel plates. The material thickness of the upper connecting structure 51, i.e. the surface plate 51, is 2 mm, for example.

The compartmental base thus comprises frame beams 11 to 21 extending in the longitudinal direction of the transport unit, the beams being uniform along the compartmental structure area, i.e. between the front and rear ends of the structure, which allows good structural rigidity to be achieved because the transverse beams do not cut the longitudinal beams 11 to 21 but the longitudinal parallel beams each extend as uniform beams 11 to 21 from one end of the compartmental structure to the other.

FIG. 6 shows a preferred embodiment of the invention in which the upper connecting structure 51, i.e. the surface plate 51, is supported to a side 70 of the base by means of a shape stiffener 80. In the preferred embodiment the shape stiffener 80 is implemented as a cutting made to the edge of the upper connecting structure 51, i.e. the upper surface plate 51. FIG. 6 also shows a wall 75 of the trailer, the wall being set into a space formed to the edge of the surface plate 51 and defined by the shape stiffener cutting 80 made to the edge of the upper surface plate 51.

FIG. 6 further shows a preferred embodiment in which there is a load distributor 85 arranged onto the upper connecting structure 51, i.e. the surface plate 51, the distributor being for example an aluminum butment plate of a thickness of 6 mm, for example. The load distributor allows point load acting on the surface plate 51 to be distributed to a wider area. By means of a second shape stiffener 90 a sufficient support is provided for the edge of the compartmental base.

With reference to FIG. 13 it is stated that a transport truck 99 comprises a body 200, which in turn comprises a base 201. The base 201 of the body 200 is a compartmental, self-supporting base made of stainless steel and forming the frame of the base. Also the walls 275 can be considered as parts of the body 200, similarly as in the first embodiment the walls 75 can be considered as parts of the trailer 100. As regards the structure of the base 201, reference is made to the specification relating to FIGS. 1 to 12, although here the longitudinal frame beams may have an equal thickness, i.e. two beams extending further down than the others, as the trailer base beams 13 and 19, need not necessarily be provided, because the axle groups 202 and 203 are not attached to the base of the body, but to the actual frame 300 of the transport truck 99 onto which the entire vehicle has been built.

Although the invention is described above with reference to an example according to the accompanying drawings, it is apparent that the invention is not restricted thereto but can be varied in many ways within the inventive idea disclosed in the accompanying claims.

What is claimed is:

1. A transport unit attachable to a transport truck, the transport unit comprising a base, wherein the transport unit is implemented without a separate frame, the transport unit base being a compartmental, self-supporting base made of stainless steel and forming the transport unit frame; the compartmental, self-supporting transport unit base comprising frame beams, frame support beams arranged in a transverse direction relative to the frame beams, an upper connecting structure made of a plate material and connecting the frame beams on the upper side of the base area, and a lower connecting structure made of a metal plate material and connecting the frame beams on the underside of the base area; the lower connecting structure made of a plate material being between the frames and the transverse frame support beams.

2. The transport unit according to claim 1, wherein the frame beams are at least principally arranged in the longitudinal direction of the transport unit.

3. The transport unit according to claim 1, wherein the frame support beams are at least principally transverse to the transport unit.

4. The transport unit according to claim 1, wherein the frame beams are tubular stainless steel beams.

5. The transport unit according to claim 1, wherein the frame support beams are tubular stainless steel beams.

6. The transport unit according to claim 1, wherein the stainless steel material used in the structural parts of the compartmental self-supporting base comprising the frame beams, the frame support beams and the upper and lower plate connecting structures is cold-rolled, or reinforced, stainless steel.

7. The transport unit according to claim 1, wherein the upper connecting structure made of a plate material comprises at least two connecting structure parts which are joined by a butt seam welding to the upper surface of the frame beam on which the butt joint between the connecting structure parts is located.

8. The transport unit according to claim 1, wherein the transport unit is a trailer, and the base of the trailer forms the frame of the trailer, one or more axle groups of the trailer being attachable to the frame.

9. The transport unit according to claim 1, wherein the compartmental self-supporting base is provided with thinner and thicker frame beams, and at least two of the thicker frame beams comprise fastening areas for fastening one or more axle groups.

10. The transport unit according to claim 1, wherein the compartmental self-supporting base is provided with thinner and thicker frame beams, the thicker frame beams extending further down than the thinner frame beams.

11. The transport unit according to claim 1, wherein the compartmental base comprises frame beams extending in the longitudinal direction of the transport unit, said beams being uniform frame beams.

12. A transport unit attachable to a transport truck, the transport unit comprising a base, wherein the transport unit is implemented without a separate frame, the transport unit base being a compartmental, self-supporting base made of stainless steel and forming the transport unit frame; the compartmental, self-supporting transport unit base comprising frame beams, frame support beams arranged in a transverse direction relative to the frame beams, an upper connecting structure made of a plate material and connecting the frame beams on the upper side of the base area, and a lower connecting structure made of a metal plate material and connecting the frame beams on the underside of the base area; wherein the compartmental self-supporting base is provided with thinner and thicker frame beams, the thicker frame beams extending further down than the thinner frame beams; the lower connecting structure made of a plate material being on the under surface of the thinner frame beams, and the thicker frame beams extending further down than the plate lower connecting structure.

13. The transport unit according to claim 12, wherein the lower connecting structure made of a plate material is between the frame beams and the transverse frame support beams.

14. The transport unit according to claim 12, wherein the frame beams are at least principally arranged in the longitudinal direction of the transport unit.

15. The transport unit according to claim 12, wherein the frame support beams are at least principally transverse to the transport unit.

16. The transport unit according to claim 12, wherein the frame beams are tubular stainless steel beams.

17. The transport unit according to claim 12, wherein the frame support beams are tubular stainless steel beams.

18. The transport unit according to claim 12, wherein the stainless steel material used in the structural parts of the compartmental self-supporting base comprising the frame beams, the frame support beams and the upper and lower plate connecting structures is cold-rolled, or reinforced, stainless steel.

19. The transport unit according to claim 12, wherein the upper connecting structure made of a plate material comprises at least two connecting structure parts which are joined by a butt seam welding to the upper surface of the frame beam on which the butt joint between the connecting structure parts is located.

20. The transport unit according to claim 12, wherein the transport unit is a trailer, and the base of the trailer forms the frame of the trailer, one or more axle groups of the trailer being attachable to the frame.

21. The transport unit according to claim 12, wherein at least two of the thicker frame beams comprise fastening areas for fastening one or more axle groups.

22. The transport unit according to claim 12, wherein an edge portion of the lower connecting structure is bent downward against the side of the frame beam extending further down and attached to the frame beam extending further down.

* * * * *